2,899,002
Patented Aug. 11, 1959

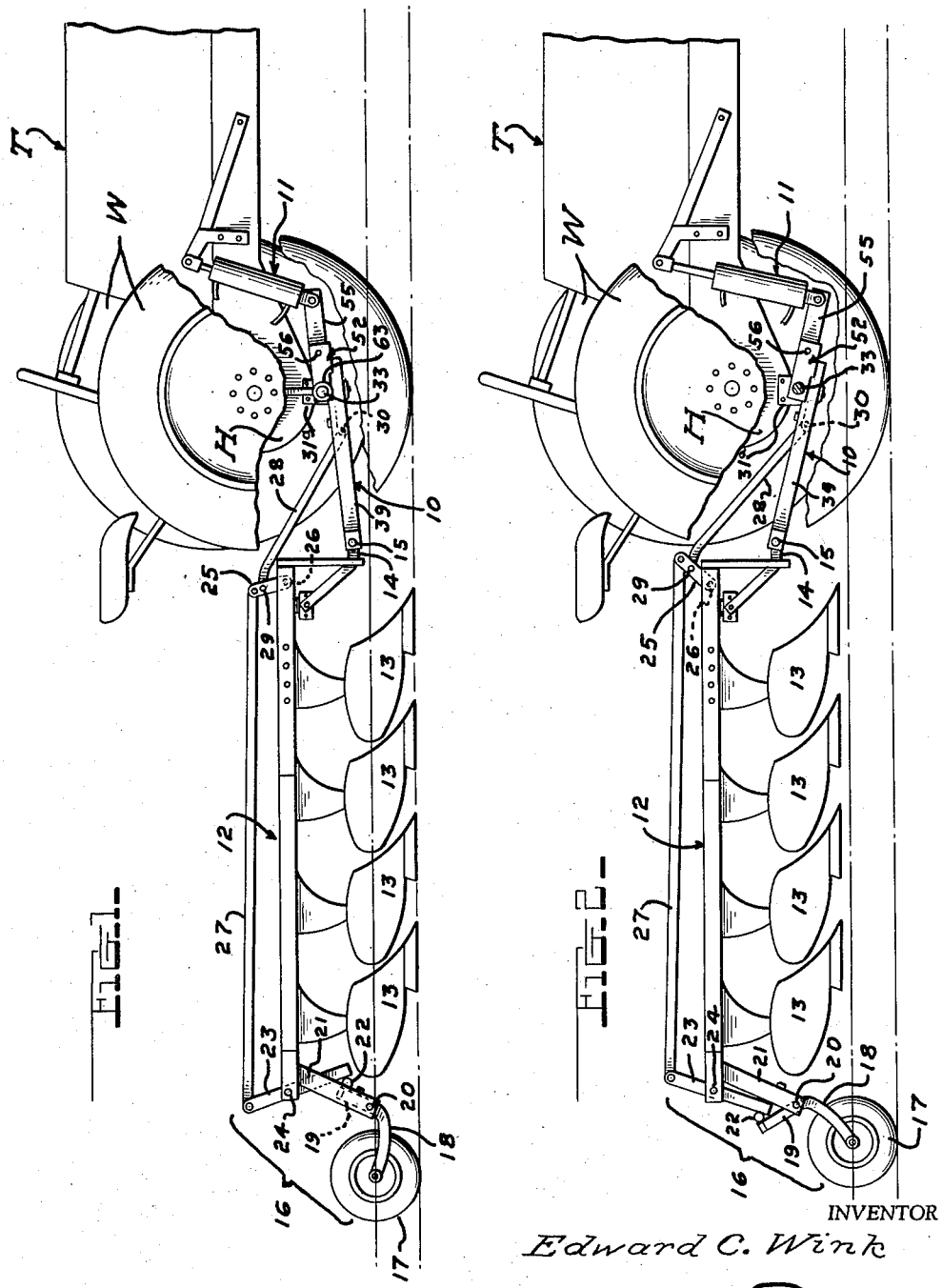

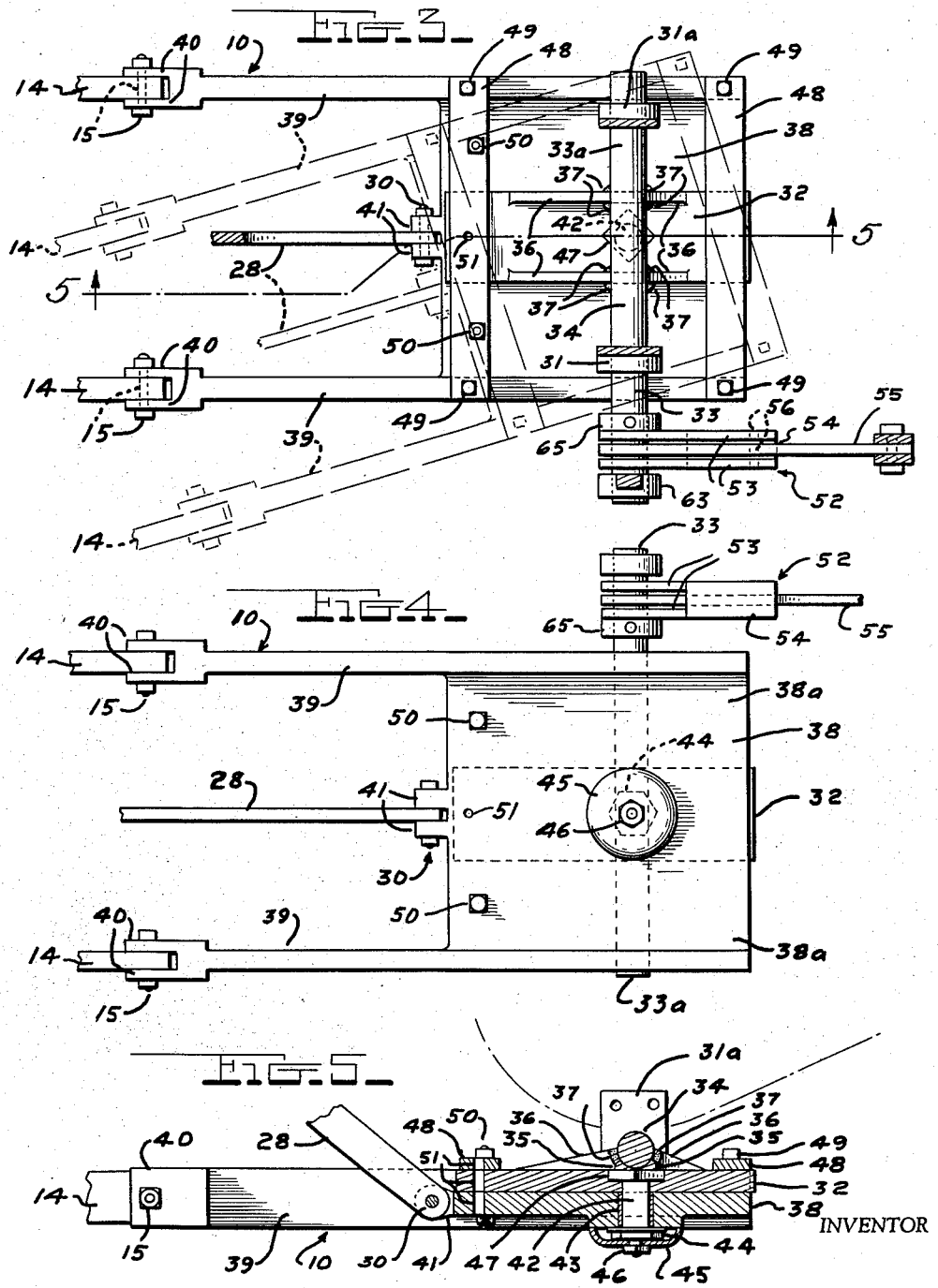

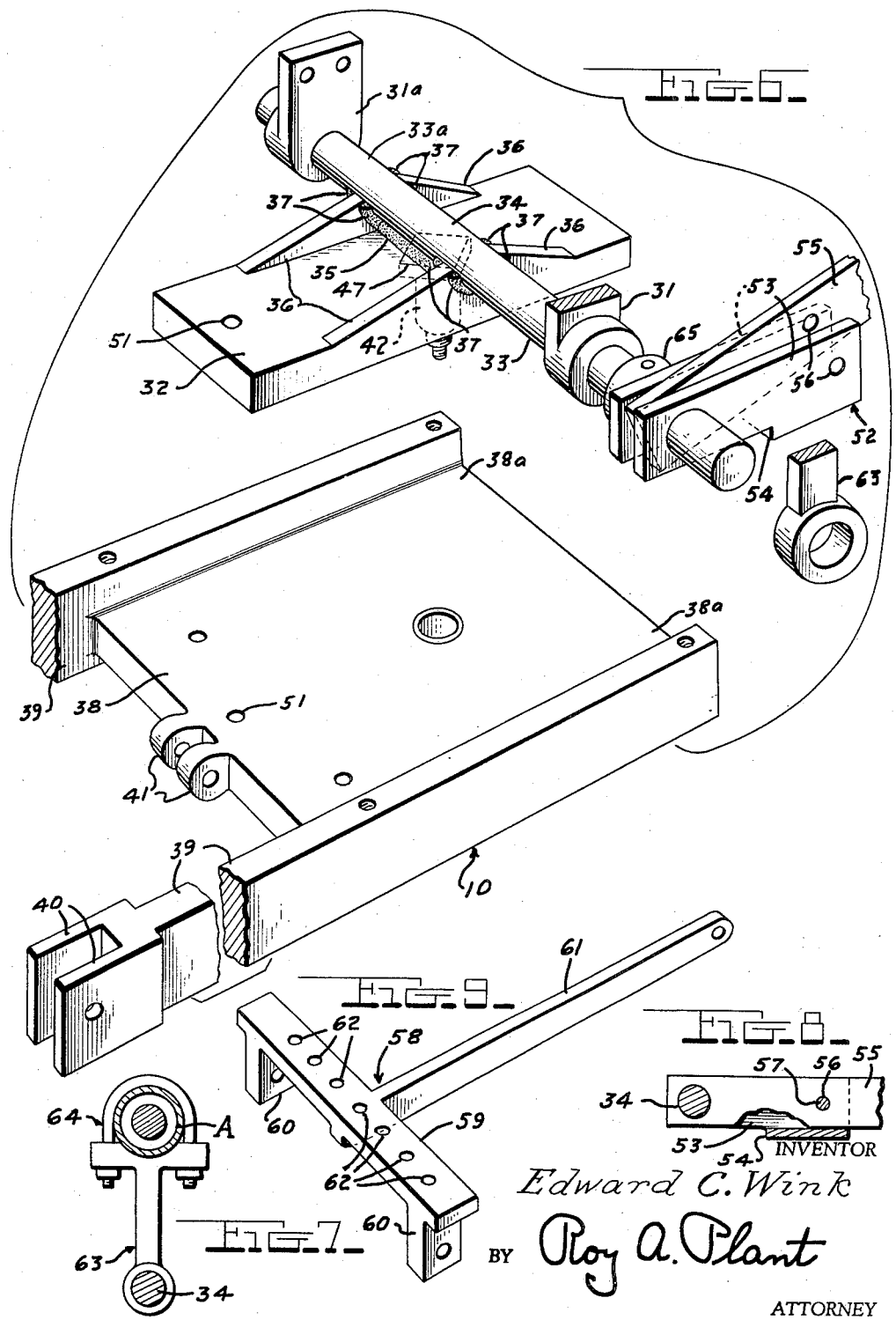

2,899,002
APPARATUS FOR CONNECTING PLOWS OR THE LIKE TO A TRACTOR

Edward C. Wink, Findlay, Ohio

Application February 19, 1958, Serial No. 716,155

3 Claims. (Cl. 172—319)

The present invention relates broadly to machinery, and in its specific phases to a hitch connection between a tractor and a gang plow or other towable equipment.

Conventional hitch connections between tractors and plows allow no lateral swinging of the plows with respect to the tractor even though this is desirable to a limited extent. The standard arrangement, when using up to three plows, utilizes a hydraulic mechanism with a high towing center, which makes it necessary to forcibly hold the plows in the ground when plowing, and yet at desired times, such as at the end of a furrow, enables it to swing the plows out of the ground, the weight of the plows being then carried by the tractor. When more than three plows are employed, this practice cannot be followed as the tractor will tip up at the front instead of lifting the plows. Accordingly, when more than three plows are to be used, the only current procedure is to mount them on a trailer and pull them with the tractor in typical trailer fashion which allows sidewise drifting, and variable depth plowing, with the plows plowing shallower when a hard spot of ground is encountered. This is not entirely satisfactory and involves the use of rather expensive and complicated means for raising and lowering the plows. It was a recognition of these problems and difficulties which led to the conception and development of the present invention.

Accordingly among the objects of the present invention is the overcoming of the noted shortcomings of the prior arrangements, and to make novel provision whereby rear supported gang plows, even having four or more plows, can be successfully used, with the front end of the plow carrying frame being supported by the tractor when the plows are raised, and with the rest of the weight being then supported by a rear caster wheel with which said frame is provided.

In carrying out the above end, a further object of the invention has been to provide a novel mechanism in which tilting of a hitch, during forward motion of the tractor and gang plow, will raise or lower the front end of the plow-carrying frame, and at the same time the rear end of said frame will be correspondingly raised or lowered automatically through raising or lowering of the trailing caster wheel.

Another object is to provide a novel towing connection having a low line of pull on the plow gang so that the tendency is to plow at a uniform depth for a single setting even though ground of variable hardness is encountered.

Another object has been to provide a novel arrangement permitting a non-rigid connection between the tractor and plow gang and limited desirable pivotal movement of the plow-carrying frame on a vertical pivot embodied in the means for connecting the hitch with the tractor.

Yet another object has been to provide a novel arrangement insuring the support of sufficient weight on the rear tractor wheels to obtain adequate traction.

A further object has been to provide a simple and inexpensive yet an effective hitch construction for connecting the plow frame or any other implement with the tractor.

A still further object has been to make novel provision permitting use of the hitch structure for jacking up the tractor.

Still further objects and advantages of the invention will appear as the description proceeds.

To the accomplishment of the foregoing and related ends, the invention, then, consists of the means hereinafter fully desribed and particularly pointed out in the claims, the annexed drawings and the following description setting forth in detail certain means of carrying out the invention, such disclosed means illustrating, however, but several of various ways in which the principle of the invention may be used.

In the annexed drawings:

Figure 1 is a side elevation showing the tractor and plow combination of the present invention with the plows lowered to operative position, and one wheel of the tractor in the bottom of a previously plowed furrow.

Figure 2 is a similar view showing the plows raised.

Figure 3 is a top plan view showing the hitch construction and the means for connecting it with the tractor, parts being shown in laterally swung positions by broken lines.

Figure 4 is a bottom plan view of the parts shown in Figure 3.

Figure 5 is a vertical longitudinal sectional view on line 5—5 of Figure 3, looking in the direction of the arrows.

Figure 6 is a disassembled perspective view showing a number of the principal parts of the hitch and mounting means therefor.

Figure 7 is a detail view showing an auxiliary bearing which braces the extending end of the transverse pivot shaft of the hitch.

Figure 8 is a partially sectioned fragmentary detail view showing the coacting arms employed in connecting the aforesaid pivot shaft with a hydraulic cylinder and piston assembly which is employed for tilting the hitch, said arms being shown as bolted together in order that said hydraulic assembly and hitch may be utilized to jack up the rear end of the tractor.

Figure 9 is a perspective view showing an adapter which may be secured to the hitch when implements other than plows are to be pulled.

In Figures 1 and 2 a tractor is conventionally shown at T and embodies a transmission and rear end housing H at the center of the rear axle, the usual traction wheels W being provided at the ends of said axle.

A hitch frame 10 is disposed under the housing H and is connected therewith by mounting means which includes both a vertical pivot and a transverse horizontal pivot, both of which will be later described. A hydraulic cylinder (preferably double acting) and pivot assembly 11 is employed for tilting the hitch frame 10 on the transverse horizontal pivot to raise and lower the rear end of said hitch frame. This frame is normally free to swing on the vertical pivot.

A plow frame 12 is disposed behind the tractor T and rigidly carries the plows 13. The front end of the plow frame 12 is provided with two laterally spaced rigid pull arms 14 which are directly connected with the rear end of the hitch 10 by transverse horizontal pivot means 15.

Raising and lowering means 16 is provided for the rear end of the frame 12 and includes a caster wheel 17. The fork or the like 18 for this caster wheel has its shank mounted in a vertical bearing 19 which is pivoted at 20 to a rigid arm 21 projecting downwardly from the rear end of frame 12. The bearing 19 has a roller or the like 22 behind the lower end of a forwardly and rearwardly swingable lever 23 which is fulcrumed at 24 on the frame 12.

A forwardly and rearwardly swingable arm 25 is pivoted at 26 on the front end of the frame 12; and a longitudinal link 27 connects the upper end of said arm 25 to the upper end of the lever 23. A forwardly declined link 28 is pivoted at 29 to the arm 25 and is pivoted at 30 to the hitch frame 10.

When the frame 12 is in plow-lowered position, as shown in Figure 1, the front end of said frame and the plows 13 are held in position by the hitch 10 and the rest is supported against deeper plowing by the caster wheel 17. When the hydraulic assembly 11 is operated to so tilt the hitch 10 as to raise the rear end of said hitch and the front end of the frame 12, as shown in Figure 2, the link 28 pulls upon the arm 25 and swings it forwardly, thereby causing the link 27 to operate the raising and lowering means 16 to correspondingly raise the rear end of said frame 12, the weight being then also supported partly by the hitch 10 and partly by the caster wheel 17. When the hitch 10 is again tilted to lower the frame 12, the means 16 permits corresponding lowering of the rear end of said frame 12. The hitch 10, when in plowing position due to the plows being restrained against plowing deeper, holds the rear wheels of the tractor down for good traction, while with prior constructions the action is just the reverse, and the weight supported by said hitch when the plows are raised, due to pivoting under the axle, has no tendency to lift the front tractor wheels from the ground, which again is the reverse of prior constructions. When the plow frame 12 is either raised or lowered, desirable horizontal pivoting of said frame with respect to the tractor, is permitted.

For the hitch construction and mounting means, reference is made primarily to Figures 3 to 6, inclusive.

Two bearings 31 and 31ª are provided to be bolted to opposite sides of the housing H of the tractor in horizontal alignment transversely of said tractor. An upper rectangular plate 32 is disposed between the bearings 31 and 31ª and is provided with two transverse horizontal pivot trunnions 33 and 33ª which are rockably received in the bearings 31 and 31ª, respectively, thereby tiltably mounting the plate 32. The trunnions 33 and 33ª are preferably formed by opposite ends of a rock shaft 34 which is welded at 35 to the plate 32; and this plate 32 may well have reinforcing flanges 36 welded at 37 to said shaft 34.

A lower substantially square plate 38 is disposed against the lower side of the upper plate 32 and is of such width that its longitudinal edge portions 38ª project laterally beyond said upper plate 32. Two longitudinal hitch arms 39 are rigidly secured to and project rearwardly from the edge portions 38ª of the lower plate 38 and are provided at their rear ends with knuckles 40 for connection with the pull arms 14 of the plow frame 12. The rear edge of the plate 38 has knuckles or the like 41 for connection with the front end of the link 28.

The two plates 32 and 38, Figure 5, are connected by vertical pivot means shown in the form of a stud 42 on plate 32 extending through a bearing bushing 43 inset in an opening in the plate 38. The stud 42 is shown as shouldered at its lower end and provided with a nut 44 and with a grease retainer 45 secured by a nut 46. This stud may well be provided with a head 47 countersunk in the top of the plate 38 and secured by some of the welding 35.

Front and rear transverse bars 48 lie slidably upon the front and rear end portions of the upper plate 32 and are secured at 49 to the upper edges of the hitch arms 39 to relieve the stud 42 of some of the strain required to hold the two plates 32 and 38 against separation during use of the hitch. Stop bolts 50 preferably extend through the rearmost of the bars 48 in spaced relation with the longitudinal edges of the upper plate 32, to limit the pivotal movement of the hitch frame 10 on the stud 42. Should such pivotal movement be undesirable when pulling implements other than a gang plow, the two plates 32 and 38 may be bolted together; and for this purpose, bolt holes 51 are shown in said plates and in the rear transverse bar 48 ready to receive a bolt (not shown).

The trunnion 33 is provided with a rigidly attached forwardly projecting arm 52 having two parallel side members 53 connected at their lower edges by a web 54. A second arm 55 is loosely pivoted on the trunnion 33 between the side members 53 of the arm 52 and projects forwardly from said arm 52. The arm 55 is connected to the lower end of the hydraulic assembly 11, Figures 1 and 2, and normally rests on the web 54. Thus, downward operation of the assembly 11, through conventional operating means (not shown), will unitarily move the two arms 55 and 52 to turn the trunnion 33 and tilt the plates 32 and 38, thereby elevating the rear end of the hitch frame 10 to raise the plow frame 12. Upon upward operation of the hydraulic assembly 11, the arm 55 is moved upwardly from the arm 52, freeing the plow frame 12 for lowering by gravity and forward pulling of the tractor. It is thus to be seen that the low pivot point for the hitch frame 10 allows the plows to automatically move to desired furrow depth as limited by the setting of hydraulic assembly 11, with the latter serving this purpose as well as lifting the plows out of the ground when desired.

In order to permit tilting of the hitch frame 10 to be utilized for jacking up the rear end of the tractor, the arms 52 and 55 are formed with bolt holes 56, Figure 8, through which a bolt or pin 57 may be passed to lock said arms against relative pivotal movement. After insertion of this bolt or pin 57, a block or the like may be inserted under the rear end of the hitch frame 10. Then the hydraulic assembly 11 may be operated to pull upwardly on the arm 55, with the result that the consequent tilting of the hitch frame 10 will elevate either or both of the rear tractor wheels from the ground, depending upon where the block or the like is placed under the rear end of hitch frame 10.

In Figure 9, a T-shaped adapter 58 has been shown for use when implements other than a gang plow are to be hitched to the tractor. The head 59 of the adapter has apertured lugs 60 to be bolted to the knuckles 40 of the hitch arms 39; and the terminal of the shank 61 is apertured for bolting to the knuckles 41 of the plate 38. The head 59 is formed with spaced openings 62 to receive clevis pins or the like.

In Figures 1, 6, and 7, an auxiliary bearing 63 is shown to brace and support the trunnion 33 against springing, a thing which is especially desirable when jacking up the rear end of the tractor. This bearing is provided with a suitable clamp 64 to engage the tractor rear axle A. This bearing 63 and collar 65 also serve to hold shaft 34 substantially against endwise movement, since collar 65 may be moved to any position suitable to the particular tractor used with this hitch frame.

From the foregoing, it will be seen that novel and advantageous provision has been disclosed for attaining the desired ends of an improved hitch for gang plows or other implements. However, attention is invited to the possibility of making variations within the spirit and scope of the invention as herein illustrated and described. Directional terms such as "horizontal", "vertical", et cetera, have been used to facilitate describing the present invention, and are not to be considered as a limitation on the invention.

Other modes of applying the principle of my invention may be employed instead of those explained, change being made as regards the means herein disclosed, provided those stated by any of the following claims or their equivalent be employed.

I therefore particularly point out and distinctly claim as my invention:

1. A tractor hitch comprising bearings for mounting in horizontal transverse alignment under the rear portion of a tractor, an upper substantially horizontal plate between said bearings and having transverse horizontal pivots engaged with said bearings to tiltably support said upper plate, a lower substantially horizontal plate underlying said upper plate, said lower plate having longitudinal edge portions extending laterally beyond said upper plate, a vertical pivot connecting said upper and lower plates, two longitudinal hitch arms secured to said longitudinal edge portions of said lower plate and projecting rearwardly from the same, means connected with one of said transverse horizontal pivots for tilting said upper plate on these pivots, said upper plate extending both forwardly and rearwardly from said transverse horizontal pivots, and front and rear transverse bars lying upon the front and rear ends of said upper plate respectively, said transverse bars being secured at their ends to said hitch arms.

2. A tractor hitch comprising bearings for mounting in horizontal transverse alignment under the rear portion of a tractor, a hitch structure having lateral trunnions at its front end and engaging said bearings to tiltably mount said hitch structure, one arm fixedly secured to and projecting forwardly from one of said trunnions, a second arm disposed longitudinally of said one arm, said second arm being loosely pivoted at its rear end on the same trunnion, means connected with the front end of said second arm for swinging this arm vertically, and stop means on one of said arms and engageable with the other of said arms for limiting downward movement of said second arm with respect to said one arm.

3. A structure as specified in claim 2, together with means for locking said arms against relative pivotal movements if desired, permitting use of said hitch structure to jack up the tractor.

References Cited in the file of this patent
UNITED STATES PATENTS

| | | |
|---|---|---|
| 1,529,042 | Teasley et al. | Mar. 10, 1925 |
| 2,416,194 | Miller | Feb. 18, 1947 |
| 2,686,465 | Silver et al. | Aug. 17, 1954 |
| 2,723,129 | Sprague | Nov. 8, 1955 |